(12) United States Patent
Wampler

(10) Patent No.: US 11,657,115 B2
(45) Date of Patent: *May 23, 2023

(54) ABANDONMENT PREVENTION SYSTEMS AND METHODS

(71) Applicant: USI Technologies, Inc., Agoura Hills, CA (US)

(72) Inventor: Christopher Wampler, Agoura Hills, CA (US)

(73) Assignee: USI TECHNOLOGIES, INC., Agoura Hills, CA (US)

( * ) Notice: Subject to any disclaimer, the term of this patent is extended or adjusted under 35 U.S.C. 154(b) by 49 days.

This patent is subject to a terminal disclaimer.

(21) Appl. No.: 17/351,383

(22) Filed: Jun. 18, 2021

(65) Prior Publication Data

US 2021/0365508 A1  Nov. 25, 2021

Related U.S. Application Data

(63) Continuation of application No. 16/265,943, filed on Feb. 1, 2019, now Pat. No. 11,042,602.

(60) Provisional application No. 62/625,940, filed on Feb. 2, 2018.

(51) Int. Cl.
G06F 16/958 (2019.01)
G06F 16/953 (2019.01)
G06F 16/955 (2019.01)

(52) U.S. Cl.
CPC .......... *G06F 16/958* (2019.01); *G06F 16/953* (2019.01); *G06F 16/955* (2019.01); *G06F 16/9566* (2019.01)

(58) Field of Classification Search
CPC .. G06F 16/958; G06F 16/953; G06F 16/9566; G06F 16/957
See application file for complete search history.

(56) References Cited

U.S. PATENT DOCUMENTS

| 2012/0005192 | A1 | 1/2012 | Bao et al. |
| 2014/0215008 | A1 | 7/2014 | Wiles et al. |
| 2016/0019194 | A1 | 1/2016 | Mondal et al. |
| 2016/0100221 | A1* | 4/2016 | Hiltch ................. H04N 21/812 725/14 |
| 2016/0313906 | A1 | 10/2016 | Kilchenko et al. |
| 2017/0212874 | A1* | 7/2017 | Urban ................... G06F 16/957 |

(Continued)

FOREIGN PATENT DOCUMENTS

WO   0157737 A2   8/2001

OTHER PUBLICATIONS

Robin Rendle "Using the HTML5 History API," Mar. 21, 2015, pp. 1-10.

*Primary Examiner* — Michael A Keller
(74) *Attorney, Agent, or Firm* — Mahesh Law Group PC; Kumar Maheshwari

(57) ABSTRACT

A method, systems and apparatuses for preventing a user abandonment from a browser window are disclosed. In an exemplary embodiment, abandonment prevent on a user mobile device comprises pushing a placeholder variable onto a history object of the browser window while the user is on a first website. The user may be directed to the first website from a referrer. User may navigate backwards using a device interface element, such as a back button. When user navigation triggers a popstate, and the history for the browser is null, the user is directed to a preferred website.

17 Claims, 9 Drawing Sheets

(56) References Cited

U.S. PATENT DOCUMENTS

| | | |
|---|---|---|
| 2018/0047044 A1 | 2/2018 | Kramer et al. |
| 2019/0007381 A1 | 1/2019 | Isaacson et al. |
| 2019/0253332 A1* | 8/2019 | Briere ................ G06F 16/9574 |
| 2019/0306137 A1 | 10/2019 | Isaacson et al. |

* cited by examiner

ABANDONMENT PREVENTION SYSTEMS AND METHODS

CROSS REFERENCES TO RELATED APPLICATIONS

This application is a continuation application of U.S. patent application Ser. No. 16/265,943, entitled as "Abandonment Prevention Systems and Methods", filed Feb. 1, 2019, which claimed benefit of U.S. Provisional Patent Application Ser. No. 62/625,940, entitled as "Abandonment Prevention Systems and Methods", filed on Feb. 2, 2018, the disclosures of which are incorporated by reference in their entirety.

BACKGROUND

Embodiments discussed herein relate generally to the field of abandonment prevention. More specifically, the embodiments relate to an apparatus and method for generating higher conversions though abandonment prevention.

Users show a preference towards the use of mobile devices such as mobile phones and others to browse websites. Due to the types of user interfaces (e.g., touch, swipe, multi-touch) that are available in mobile device, users don't use a mouse to close a web browser window. Accordingly, it can be challenging to determine and/or prevent abandonment of a particular website. Better systems for detecting and preventing mobile device-based user abandonment is desirable.

SUMMARY

Exemplary embodiments are directed to systems and methods of detecting and preventing mobile device-based user abandonment. In an exemplary embodiment, a method of preventing a user abandonment from a browser window on a user mobile device comprises pushing a placeholder variable onto a history object of the browser window while the user is on a first website. The history object including a preferred website, a referrer to the first website or the first website being the preferred website. Further the variable placeholder is pushed onto the history object between the first website and the referrer or within a preset time delay after user arrives at the first website. Additionally, redirecting the user to a preferred website upon detecting that a popstate is triggered and the history for the browser window is null or setting a listener on the browser window to detect a popstate. Furthermore, the referrer includes a link on a website, an email, a text message or a mobile device application. The method further including, displaying an advertisement upon detecting a user abandonment event.

In one exemplary embodiment, a device for preventing abandonment from a browser window on a mobile device comprises, a processor comprising one or more sequences of instructions to prevent abandonment. In particular, the processor comprises one or more sequences of instructions which when executed by the processor cause the processor to carry out the steps of (a) pushing a placeholder variable onto a history object of the browser window while the user is on a first website, and (b) redirecting the user to a preferred website upon detecting that a popstate is triggered and the history for the browser window is null.

Additionally, in one exemplary embodiment, a system for preventing abandonment from a browser window on a mobile device comprises, a processor comprising one or more sequences of instructions to prevent abandonment. In particular, the processor comprises one or more sequences of instructions which when executed by the processor cause the processor to carry out the steps of (a) pushing a placeholder variable onto a history object of the browser window while the user is on a first website, and (b) redirecting the user to a preferred website upon detecting that a popstate is triggered and the history for the browser window is null. The system may comprise a web server computer system in communication with at least one content provider and the user mobile device.

BRIEF DESCRIPTION OF THE DRAWINGS

Features, aspects, and advantages of the embodiments will become apparent from the following description, appended claims, and the accompanying exemplary embodiments shown in the drawings, which are briefly described below.

DETAILED DESCRIPTION

Figure 1:
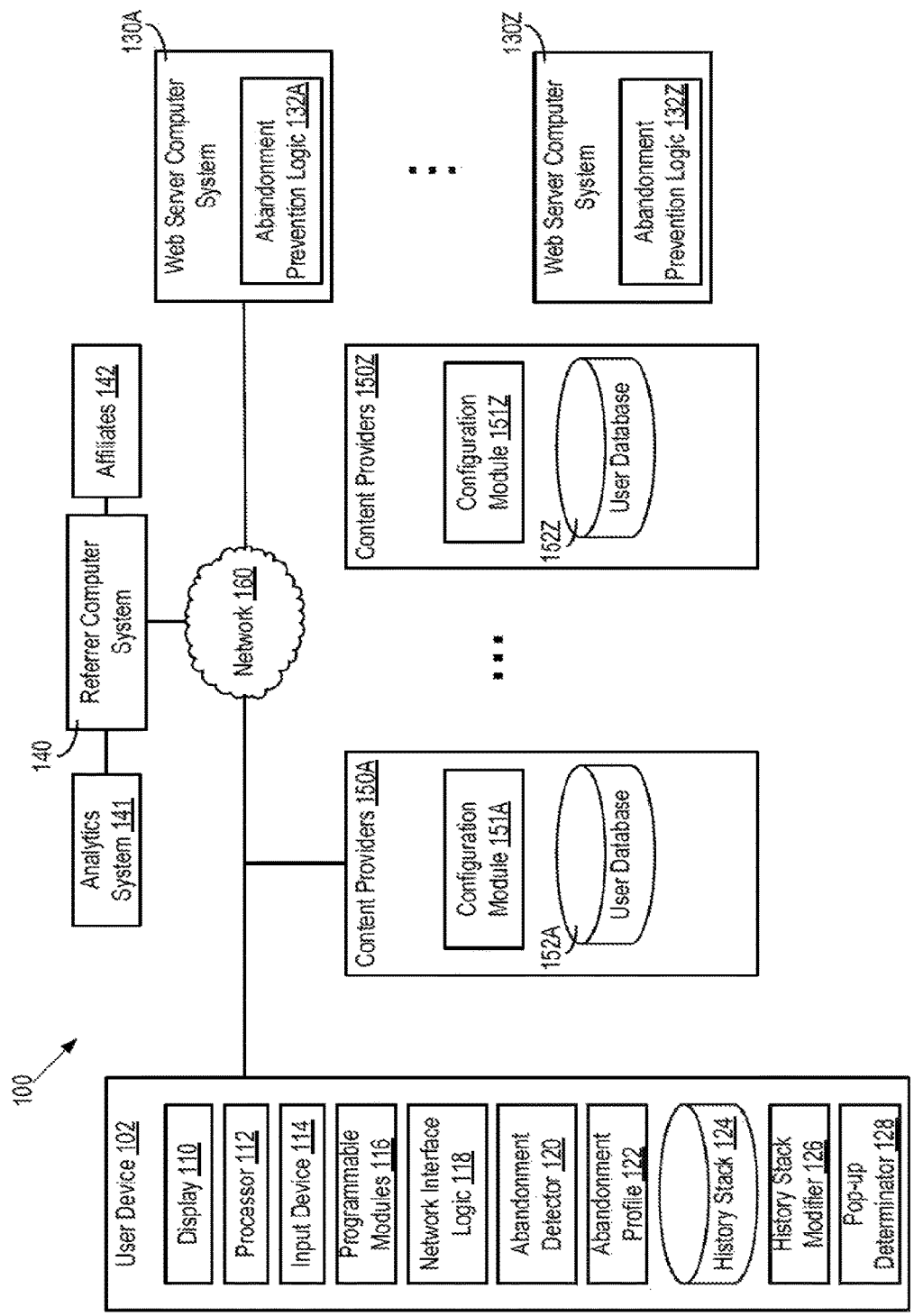
FIG. 1 is a schematic view of a system, according to an exemplary embodiment.

It is to be understood that the following detailed description is exemplary and explanatory only, and is not restrictive of the embodiments as claimed. Currently, engaging users of a mobile browsing session who are abandoning a web page by returning from the site of origin (link from referrer) is challenging. The systems described herein are configured to capture the back event of a user navigating from a mobile device by way of the back button (either the mobile device's physical back button or the mobile browser's back icon or user gesture). In some embodiments, the system may be configured to listen or monitor the mobile browser's history object. The system may optionally place a place-holder within the push state of the history object to set a listener on the popstate of said history object.

In some embodiments, the history object stores the series of pages that a user has visited while the user is on a website. For example, the user may visit webpages A1, A2 and A3 as a user navigates. In this example, if the user selects the back button or function while on webpage A3, then the history object will be A1 and A2. If the user goes all the way back to A1 and chooses the back button or function, then the history on that web browser would be null and the user will exit or abandon the process.

In various embodiments, when the user enters the website, the history object may store a place holder (e.g., u1). As the user navigates the website, the history object will may have u1, A1, A2, A3. If, the user navigates all the way back to A1 (point of entry) and presses "back" again, the user would not be taken out of the site but will be taken to the placeholder and providing an indication that the user wishes to leave the site. At this point the users back out of the site has been circumvented or prevented and the referrer or advertiser may engage with a user with a different screen.

The exemplary embodiments may be advantageous in many aspects. The user abandonment detection and prevention may be used for manipulating navigation on a site as a safeguard for the visitor. For instance, a visitor may inadvertently or mistakenly leave a session without saving or submitting data. Since the data may not be retrieved once the site is abandoned the visitor is left frustrated without a remedy. The abandonment prevention would therefore be beneficial in averting a potential disaster here as it may, for example, prompt the visitor to confirm desire to leave without saving, submitting, etc. before allowing the abandonment.

In some instances, user abandonment may result in undesirable cart modification. This may be caused, for example, when the site architecture does not prevent a double action on a GET request. For example, a visitor on the product page may press the back button which would normally navigate the visitor away from the page and modify the cart. To that end, preventing user abandonment can advantageously avoid cart modification and allow a visitor to continue with a transaction or reconsider navigating away from the current page.

Tracking visitor behavior can be a useful analytic in that the data may be used for improving site navigation and performance among other things. Therefore, when a user abandonment is detected the visitor may be redirected to an interstitial page which logs data about the visitor activity, including that the back button was pressed. The visitor may be provided an option to navigate from the interstitial page or be automatically redirected from the interstitial page to a preferred website. In situations where the preferred website is an advertiser, the analytical data about the user, including history of user abandonment, may be considered in determining the appropriate type of content to display.

The system may also connect the visitor to a content provider promoting an event where the visitor may be made an offer conditioned on user abandonment. For instance, the visitor may arrive on an offer page showing an offer such as "press 'BACK' now to enter to win a grand prize." In some cases, the visitor may arrive on the offer page as a result of system redirection based on user abandonment on another site. In such a case the offer may state "press 'BACK' again to enter to win a grand prize." As such, visitor abandonment (pressing BACK on the device) may constitute visitor acquiescence to further actions by the system or content provider (e.g. advertiser).

Following a purchase, a visitor may wish navigate backwards from the purchase confirmation page instead of, for example, "X-ing out" of the browser window, opening a new tab, or entering a new URL, to continue browsing activity. As such, user abandonment may be detected when a user hits the back button after the purchase. Instead of moving back through the new defunct checkout flow, the user abandonment at the confirmation page alerts the system to redirect the visitor back to the home page.

In some instances, back button may be essentially treated as a shortcut navigation to the home page of a website. That is, a visitor navigating a website with a plurality of pages may advantageously return to the home page from any other page by pressing the back button. Here, the system may include a plurality of push states to that backing out from any page is detected as user abandonment, whereby the visitor is then redirected to the home page. Of course, this may be accomplished for related websites that link to each other. That is a particular page of a website, which is one of a plurality of websites may server as the home page. Accordingly, user abandonment detected on any page of this group of websites redirects the visitor to the home page.

Additionally, the system redirection may be configurable by the content provider. For instance, the content provider may have preset requests for how the system handles a visitor that backs out from its page. A visitor abandonment may result in the visitor redirection to a preferred website provided by a content provider. If a visitor attempts to back out of the preferred website as well, the system may direct the visitor to yet another preferred website. This may continue for a number of preferred websites and content providers.

Referring to FIG. 1, FIG. 1 illustrates a schematic diagram of a system 100 in accordance with an exemplary embodiment. System 100 may be configured to reduce, eliminate or prevent abandonment or redirection by a user from a website. System 100 may include a user device 102, web server computer systems 130A . . . 130Z, referrer computer system 140, analytics system 141, affiliates 142, advertisers 150A . . . 150Z and a network 160. In some embodiments, the systems shown in system 100 may be a distributed computer system that is connected by a network 160. In other embodiments, one or more of the following systems (the web server computer systems 130A . . . 130Z, the referrer computer system 140, and the advertisers 150A . . . 150Z) may be collocated or perform operations on a cloud-based system such as but not limited to Azure®, AWS®.

A user device 102 may be a desktop computer, mobile device, mobile phone, tablet, laptop, etc. The user device 120 may be connected to a network 160 and in communication with a referrer computer system 140, a web server computer system 130A and an advertiser 150A. Generally, a user device 102 is directed to a webpage by the referrer computer system 140. The webpage is viewed on a browser window on the user device 102. The webpage may comprise HTML, Java®, Java Script, Scripting or the like languages from advertiser 150A-150Z. The web server computer system 130a-130Z may determine if a user back-out event takes place on the user device 102 and perform actions as further explained below.

Starting with the user device 102, the exemplary embodiments contemplate essentially any device suitable for web browsing. Non-limiting examples include, for example, a handheld computer, a cellular phone, smart phone, mobile handheld wireless e-mail device, personal digital assistant, portable gaming devices, or other computing device capable of interfacing directly or indirectly to the Internet or other network connection. With reference to FIG. 1, the user device 102 includes various hardware and software. User device 102 includes a display, 110, processor 112, input device 114, programmable modules 116, network interface logic 118, abandonment detector 120, abandonment profile 122, history stack 124, history stack modifier 126 and pop-up determinator 128.

User device 120 includes a display 110 which may be made from LED, OLED, CRT, ELD, PDP, LCD, etc. technologies. Other embodiments of a display 110 may include display type that is suitable for viewing web content is envisioned here. The display 110 may be a touch screen display comprising a back, home or other web navigational graphical elements (buttons).

The user device 102 also comprises processor(s) 112 and any other hardware required for, among other things data communication, networking and displaying web content. The processor 112 may be a multi-core or single core processor that is configured to execute instructions from programmable modules 116, input device 114 or other software. In various embodiments, the processor(s) 112 may be an Intel® processor, a AMD® processor, or an ARM® architecture based processor.

The input device 114 permits users to provide input to the user device 102. The input device 114 may comprise a back, home button or other web navigational buttons. The input device 114 may be a touch interface device, a motion interface device, keyboard, mouse, taptic touch interface device. The input device 114 may provide the user the ability to swipe or motion to perform a back operation for website navigation or other types of website navigation using touch or motion interface.

The programmable modules 116 may include an operating system, one or more applications, one or more application store applications designed to be executed by the processor 112 for mobile device 102. The programmable modules 116 may include a browser application for viewing webpages.

The network interface logic 118 is configured to receive data, commands, webpage related information from the user device 102 to communicate with the network 160. In some embodiments, the network interface logic 118 may be wireless modem running on various protocols, such as but not limited to 802.11x protocol, EVDO, Wi-Fi, LTE, 3G, 4G and 5G, etc.

The user device 102 may further include an abandonment detector 120 that is configured to detect various types of abandonment events, such as but not limited to, back-out, home button, closing the window, changing the application, in-coming message, etc. In some embodiments, upon detecting a potential abandonment event, the abandonment detector 120 may send an alert to the programmable modules 116 or query the user's abandonment profile 122 regarding the appropriate action to be taken for a particular type of abandonment request. In some embodiments, after a back-out abandonment event, the history stack 124 may be called after having been modified by the history stack modifier 126. In some embodiments, the pop-up determinator 128 may be called to generate a pop-up message for the user.

The user device 102 may have a programmable module 116 that configures an abandonment profile 122 after reviewing user input via input device 114 regarding the preferred user abandonment behavior. In some embodiments, the user may prefer a pop-up state. In other embodiments, the user may desire to have abandonment prevention for certain categories of products. In other embodiments, the abandonment profile 122 may be configured provide back-out prevention for certain categories of product and not provide back-out prevention for other categories. For example, the user may desire back-out prevention for preferred activity products or services (healthy, exercise, and inspiration), whereas for undesired activity products or services (sugary foods, expensive items, entertainment), the user may not desire back-out prevention. Accordingly, the abandonment profile 122 may learn from past user behaviors and provide back-out abandonment prevention or fail to provide back-out abandonment prevention.

The user device 102 may further include a history stack 124 where one or more history objects are stored in one or more non-transitory storage media as well as a history stack modifier 126 to modify one or more history stack objects. The pop-up determinator 128 is configured to permit the system to detect when a popstate has been triggered by the user providing input to the user input device 114. Upon detecting a popstate, the abandonment detector 120 determines whether the history is a null state corresponding to abandonment. The abandonment profile 122 is accordingly modified. The web server computer systems 130A-Z, using the abandonment prevention logic 132A-Z accordingly detect abandonment and engage the user.

The system 100 may include a referrer computer system 140, analytics system 141 and affiliates 142. In some embodiments, referrer computer system 140 may be a search engine such as but not limited to Google®. In other embodiments, the refer computer system 140 may be an affiliate computer system 142 of the referrer computer system 140. The referrer computer system 140 may communicate with the analytics system 141 to track the user's abandonment ratio when determining which content to serve to the user device 102. Analytics system 141 may be a computer system that is configured to communicate with one or more of the referrer computer system 140, the affiliates computer system 142, and the network 160.

Network 160 is any network or combination of networks of devices that communicate with one another. For example, network 160 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The system may include one or more content providers 150A-Z. The content providers can be any source that can provide content viewable on the user device 102. In an exemplary embodiment, the content providers 150A comprises a configuration module 151A and a user database 152A to enable maintenance of data for a user of the device 102 (and potentially multiple other users) for delivery of customized content to the user. As a non-limiting example, the content providers 150A may be an advertiser. As such, the advertiser may have a profile for a user of device 102 stored in the user database 152A. Following a user abandonment event, the system may engage the user device 102 to connect the device 102 with content provider 150A. Upon recognizing the user of the device 102, the content provider may then deliver customized content such as advertisements to the device 102.

In some instances, a user of the device 102 may have preset preferences with a content provider such that only certain desirable content can provided to the device. As a non-limiting example, the content may be limited to special offers, news, entertainment, etc.

Figure 2:
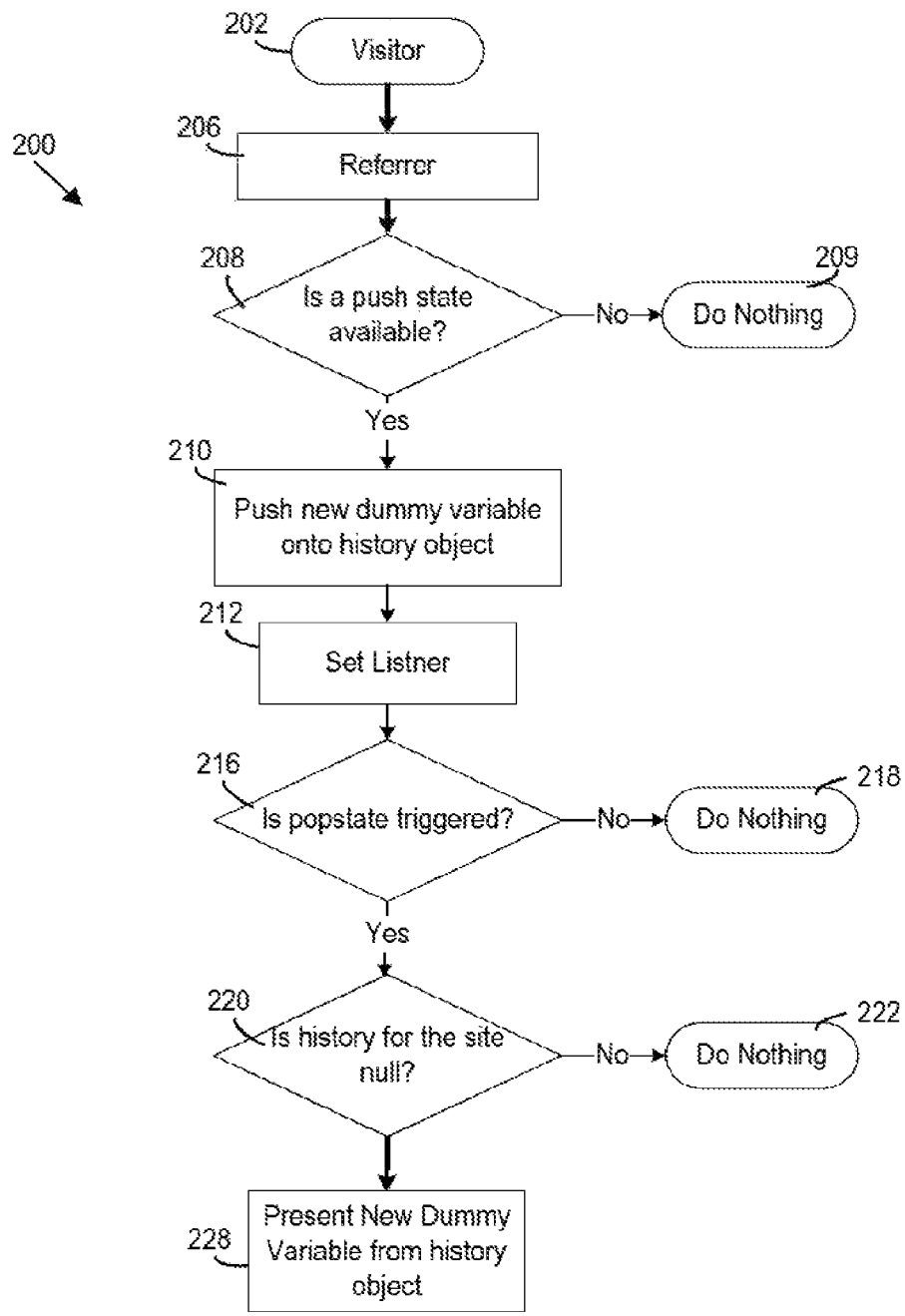
FIG. 2 is a process flow diagram that may be implemented by the system shown in FIG. 1, according to an exemplary embodiment.

FIG. 2 shows a flow diagram in accordance with an exemplary embodiment illustrating mobile back-out capture process 200 with the web server computer system 130A. Initially, a visitor 202 enters a webpage via a referrer 206. The visitor 202 views the webpage in a web browser application on the user device 102. The system 100 determines whether a push state is available on the history object of the web browser of the user device 102, as shown in step 208. The system 100 determines whether a push state is available by determining if the history object is null. A push state is not available when the history object is null. If a push state is unavailable, the system 100 does not proceed to process 209 with back-out capture. But if a push state is available, the system 100 pushes a variable placeholder onto the history object through a push state function as shown in step 210.

Next, the system 100 sets a listener 212 to detect if a pop state is triggered 216. The system 100 does not proceed 218 with back out capture, if a pop state is not triggered. However, if a pop state is triggered, the system 100 determines if the site history is null at step 220. If the site history is null, the system 100 concludes that a back-out event (e.g. visitor pressing the back button) has occurred. At step 228, the variable placeholder is presented from the history object. If history object state is a null state is not present the system 100 does not take any action at step 222.

Figure 3:
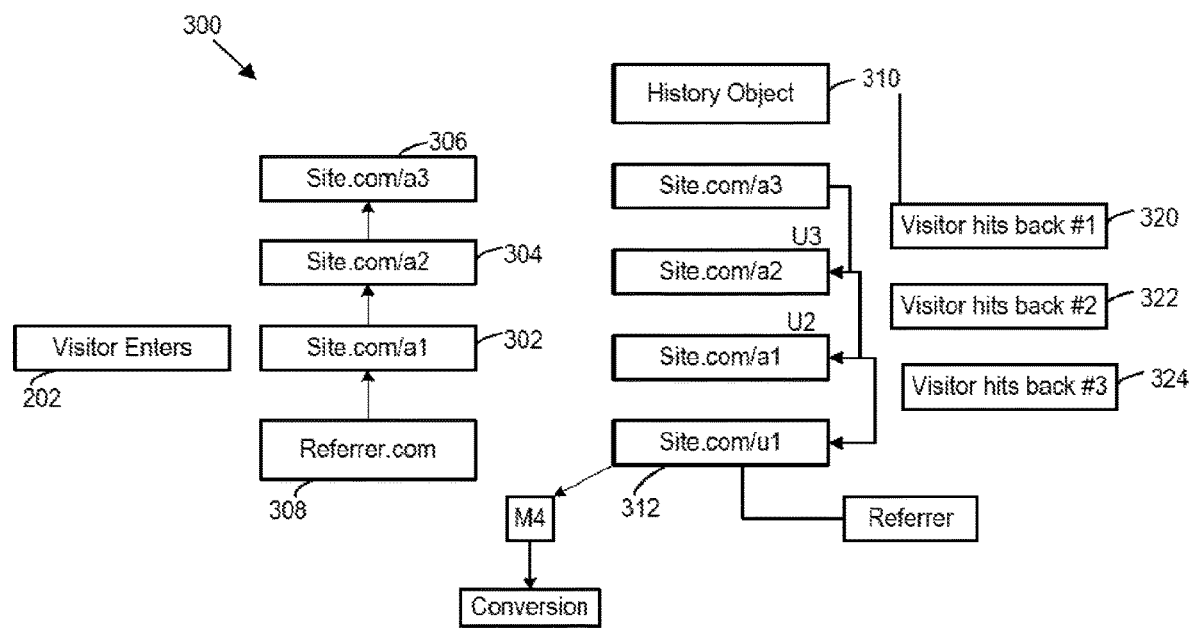
FIG. 3 is an example website navigation flow diagram that may be implemented by the system shown in FIG. 1, according to an exemplary embodiment.

FIG. 3 shows a back-out capture after multiple page visits, in accordance with an exemplary embodiment. Here, the visitor 202 visits web page 302 of a first website (site.com) from a referrer site (referrer.com) 308. Upon entry to site-.com the system 100 pushes (or stores) a placeholder variable site 312 (site.com/u1) onto the history object 310. The visitor then consecutively moves to web page 304 (site.com/a2) and then to web page 306 (site.com/a3). The history object 310 of the visitor's 202 mobile browser stores the browsing history of a1-a3. The visitor then attempts to leave the most recent site a3, by selecting the back button on the user device 102 three times 320, 322 and 324 to leave the website. Once the visitor navigates all to A1 and presses back on the user device 102, the visitor will not be taken out of the referrer.com but instead the user may be redirected to website U1, which alerts the system (by detecting a pop state and null history state) that the visitor is attempting to leave the site. At this point the visitor back-out abandonment from the site has been circumvented or presented and the system 100 is may engage the visitor based at least in part of the user's previous navigation pattern (A1 to A2 to A3 may lead to a conversion based on historical system data by displaying site M4). The system 100 may use the abandonment prevention logic 132A-132Z to determine that any user that follows the navigation patter A1 to A2 to A3 and then back-out abandon will have a predetermined calculated probability (greater than 0.5 or less than 0.5) that displaying M4 webpage after the previous event may lead to a desired result. In some embodiments, the desired results may be a conversion, gathering of information, making a sale or connecting with another referrer website. In some embodiments, the referrer.com 308 may provide the website U1 and M4 to the user device 102.

Figure 4A:
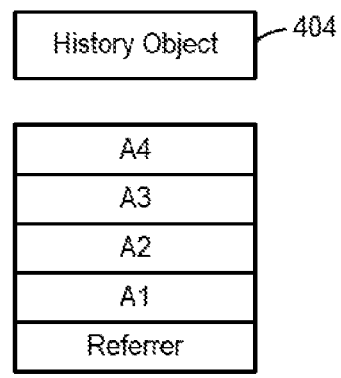
FIG. 4A is a sample history object stack according to an exemplary embodiment.
Figure 4B:
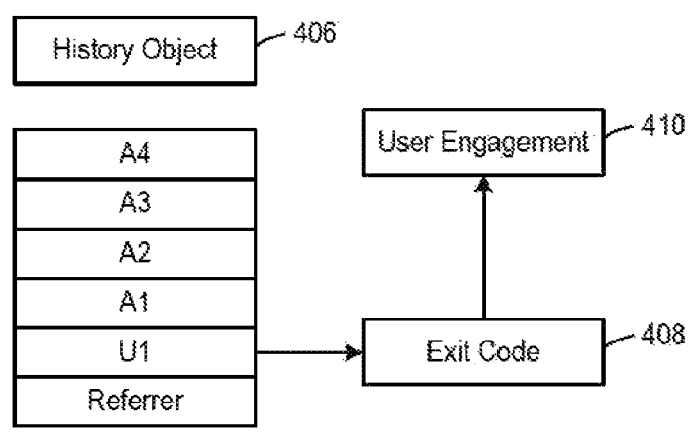
FIG. 4B is a sample history object stack according to an exemplary embodiment.

FIGS. 4A and 4B illustrate the history objects 404 and 406. The history object 404 is shown in FIG. 4A without the system 100 where a visitor arrives at webpage A1 from a referrer, and subsequently visits pages A2-A4. With the system 100 of the exemplary embodiments, the history object 406, as shown in FIG. 4B, is modified such that upon arriving to A1 from a referrer, a placeholder variable (U1) is placed between A1 and the referrer in the history object. As such, when the visitor attempts to navigate back from A1, the placeholder variable initiates an exit code 408 which leads to the user engagement by the system 410. The user engagement 410 may comprise any number of actions, including but not limited to, returning the visitor to any one of pages A1-A4 or to a new website altogether.

Figure 5:
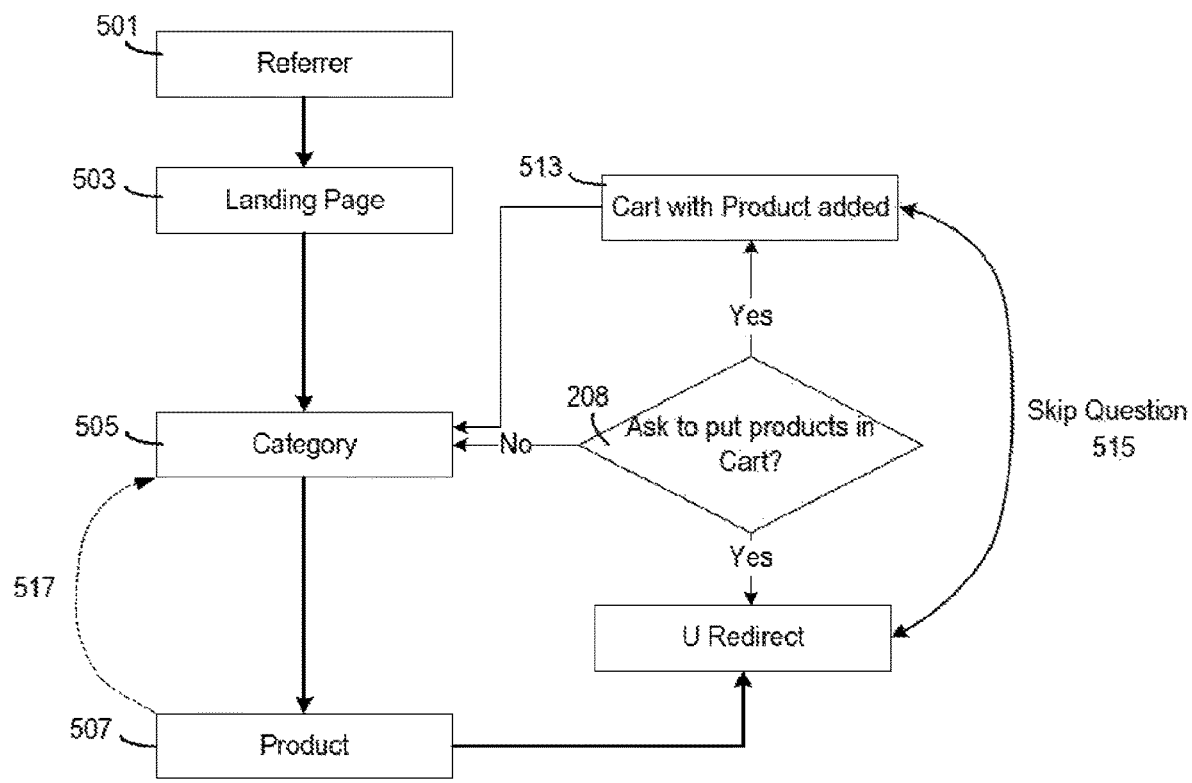
FIG. 5 is a process flow diagram that may be implemented by the system shown in FIG. 1, according to an exemplary embodiment.

The system 100 may also be used to redirect a visitor on an e-commerce website or a website involving type of transactions. For instance, in FIG. 5, a referrer 501 directs a visitor to a landing webpage 503. The placeholder variable is pushed onto the visitor's history object, shortly thereafter. Next, the visitor may navigate to the category page 505 and subsequently to the product page 507. Generally, a popstate is triggered when a user navigates to the new state (e.g. placeholder variable) created by the pushstate function. Therefore, when the visitor decides to navigate back from the product page 507 to the category page 505 a popstate is triggered and the visitor reaches the placeholder variable U Redirect 509 which keeps the visitor on the current page and provides the option 208 to put products in cart 513. If the visitor agrees, the product(s) are added to the cart 513. Upon declining, the visitor is directed back to the category page 505. If the U redirect 509 function receives a visitor who has a cart with product(s) added, then the query 208 may be skipped at step 515.

Figure 6:
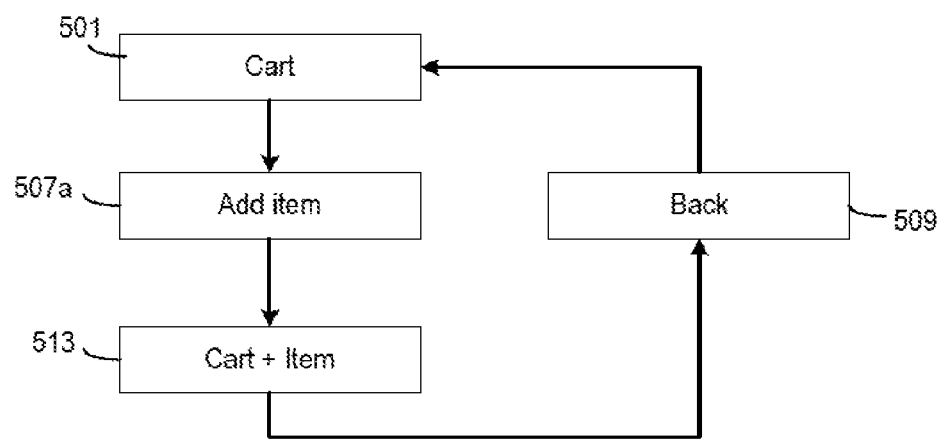
FIG. 6 is a process flow diagram that may be implemented by the system shown in FIG. 1, according to an exemplary embodiment.

Visitor redirection, in accordance with an exemplary embodiment, is also shown in FIG. 6. A visitor with a cart 507 adding item(s) 507a attempts to, with the cart containing the item(s) 513, leave the page (e.g. check out page) 509 by pressing the back button on his user device 102. Again the user abandonment is prevented by redirecting the visitor back to the initial page 507 where the visitor may add or remove items from the cart. Of course, depending on the website, the visitor may have host of options such modifying the order or make changes to the cart, such as placing the order on hold.

Figure 7:
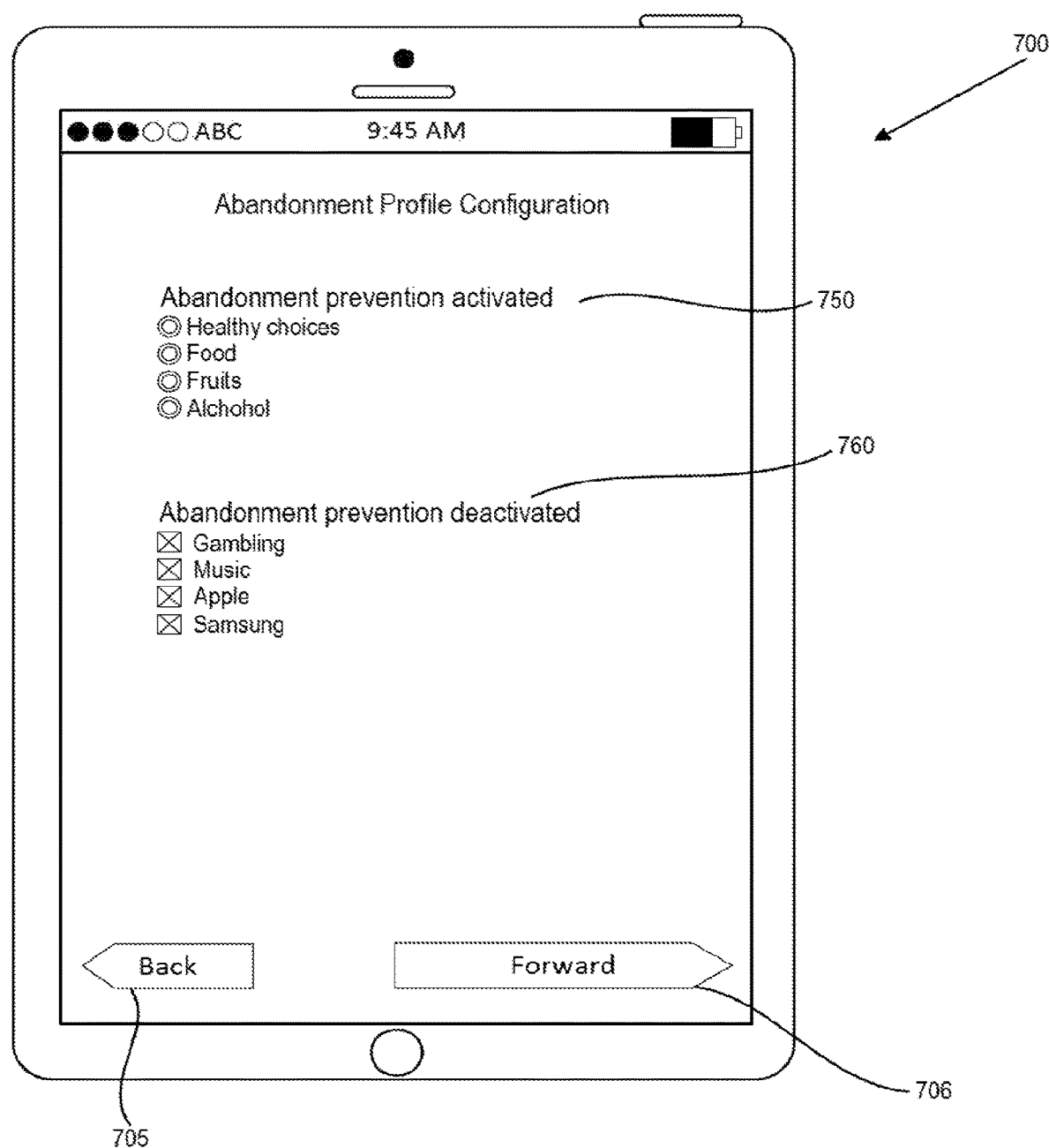
FIG. 7 is a screen shot of a sample browser.

In FIG. 7, illustrates a user device 700 comprising graphical elements for navigating back 705 and forward 706 on a browser. The display also comprises graphical elements 750, 760 that the mobile user may use to configure the abandonment profile. As shown, the abandonment profile for the user may be set such that the content provided after abandonment may include healthy choices, foods, fruits and alcohol. At the same time, the user has deactivated the abandonment profile option to not receive or be directed to content relating to gambling, music, Apple inc., or Samsung inc. content. As such, a whole host of abandonment options may be designed to allow customization of how the user abandonment is treated by the system.

Figure 8:
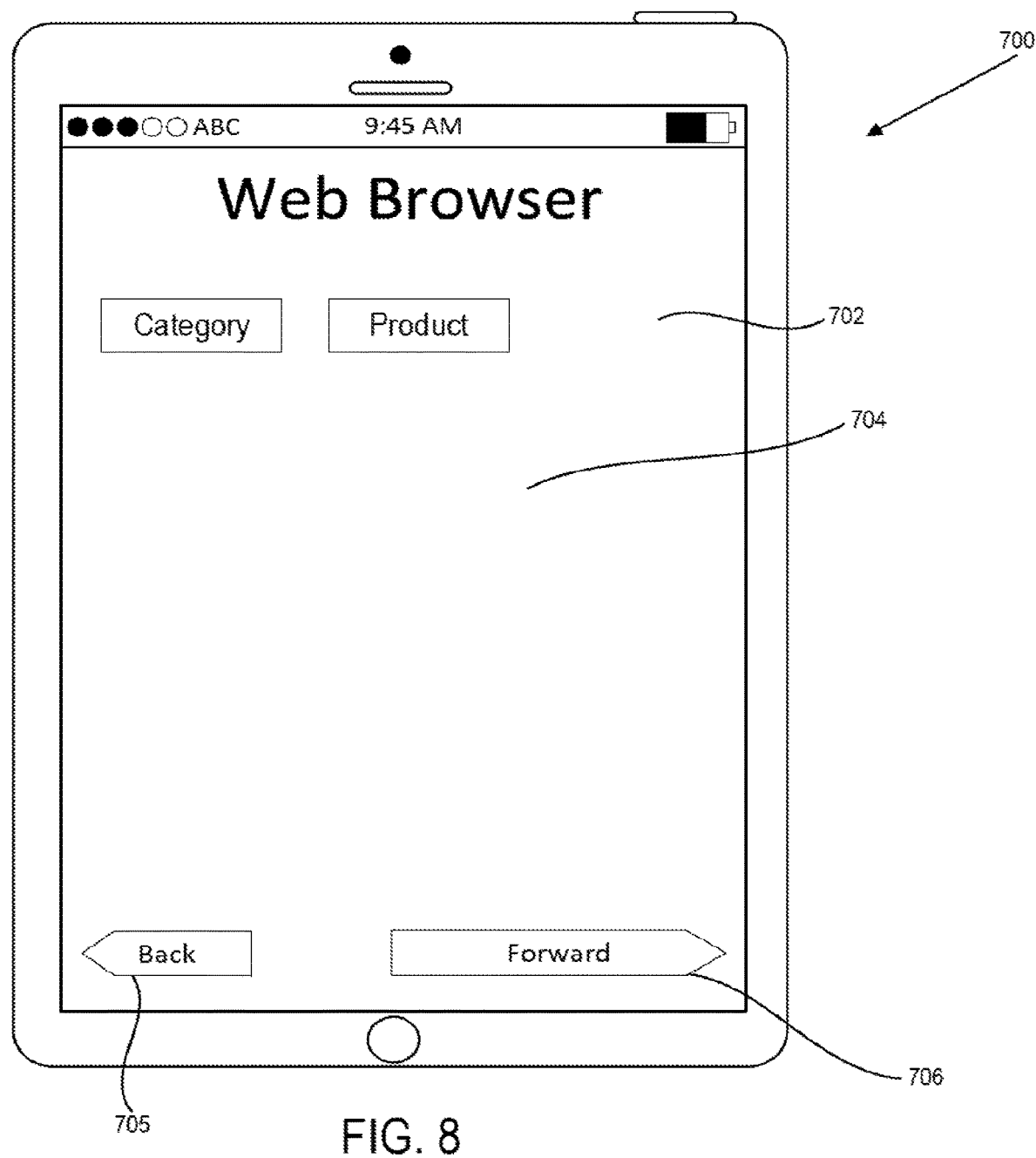
FIG. 8 is a screen shot of another sample browser.

FIG. 8 depicts a user device 700, in accordance with an exemplary embodiment. Here web content 704 comprising a Category and Product elements is viewed by a visitor on the display 702 of the device 700. The input device 706 comprises a touch screen with graphical elements for navigating "Back" and "Forward." Moreover, the display may further be responsive to biometrics (voice, fingerprint, retina, etc.) or gestures, as a part of the input device 706. The device shown also has a physical home button. Accordingly, in some instances pressing Back, forward or the home button may result in navigation away from a webpage, which identified by the system 100 as user abandonment.

Figure 9:
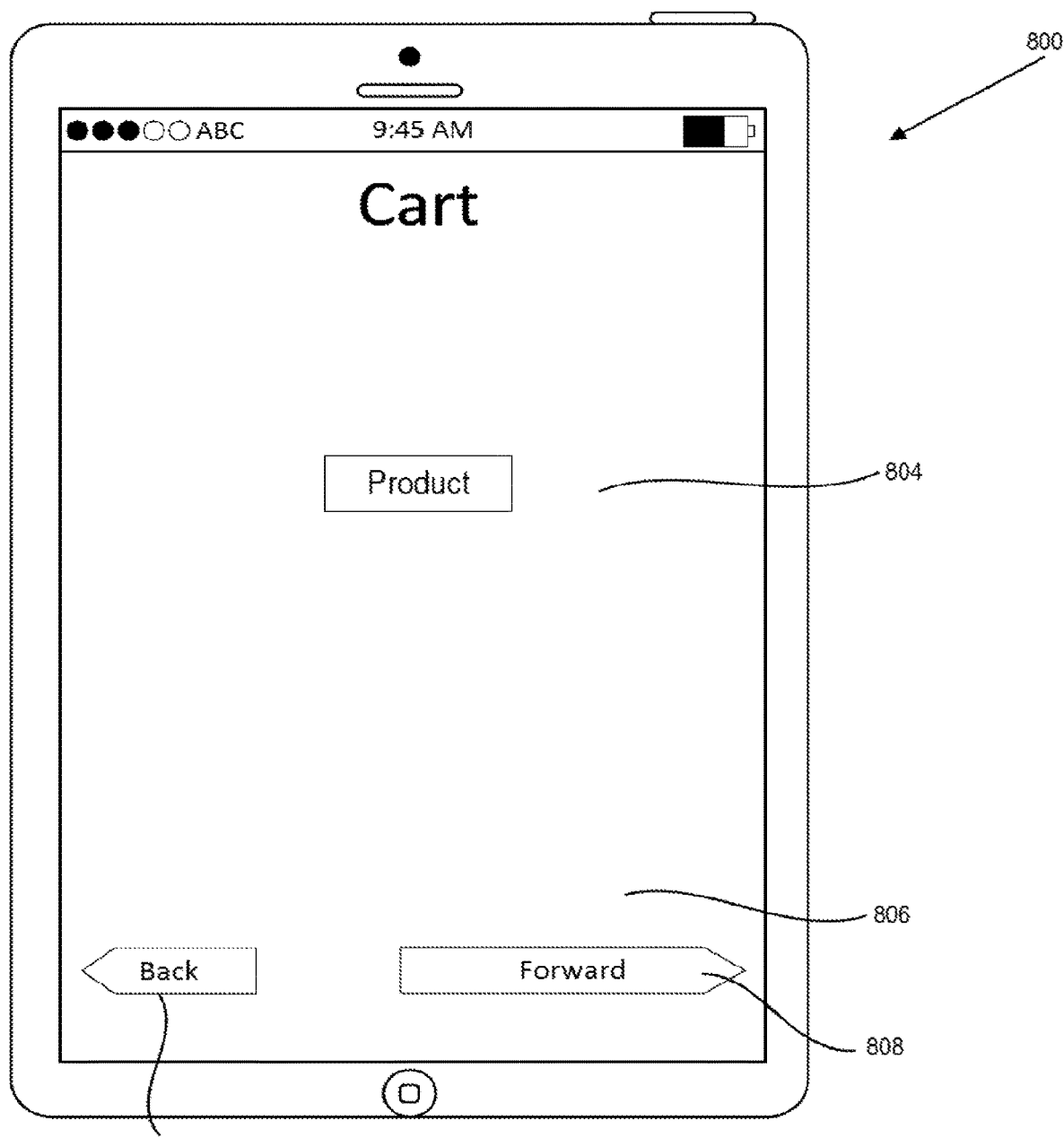
FIG. 9 is a screen shot of yet another sample browser.

FIG. 9, also depicts a user device 800, in accordance with an exemplary embodiment. Here too, the device 800 comprises a display 804 for displaying web content 806. The input device 808 comprises a text on numbers input system along with a "Back", "Forward" and home navigational buttons. As with the device FIG. 8, this device 800 may also comprise a touch screen as well as biometric sensor as a part of the input device. Again, navigation with the input device components may result in navigation away from a website which is identifiable by the system 100 as user abandonment.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. Some like components have been described in the present disclosure using the same reference numerals in different figures. This should not be construed as an implication that these components are identical in all embodiments; various modifications may be made in various different embodiments. It should be noted that the elements and/or assemblies of the enclosure may be constructed from any of a wide variety of materials that provide sufficient strength or durability, in any of a wide variety of colors, textures, and combinations.

What is claimed is:

1. A method of preventing a user abandonment from a browser window on a user mobile device, the method comprising:
   determining an abandonment event upon detecting that a popstate is triggered by a user;
   querying an abandonment profile of the user to determine an action to take responsive to the abandonment event;
   directing the browser window based on the action; and
   wherein the abandonment profile is modified based on past user behaviors.

2. The method of claim 1, further comprising determining an abandonment ratio for content of one or more web pages; and
   wherein the action is based on the abandonment ratio.

3. The method of claim 1, wherein the past user behaviors comprise categories of products.

4. The method of claim 1, wherein directing the browser window comprises navigating to an interstitial page.

5. The method of claim 4, further comprising:
   receiving a selection of one or more products to be purchased by the user; and
   wherein the interstitial page gives the user an option to place the one or more products in a cart.

6. The method of claim 1, wherein determining an abandonment event further comprises detecting that a history for the browser window is null.

7. A system for preventing user abandonment from a browser window on a user mobile device, the system comprising:
   a processor; and
   one or more sequences of instructions, which when executed by the processor cause the processor to carry out the steps of:
   determining an abandonment event upon detecting that a popstate is triggered by a user;
   querying an abandonment profile of the user to determine an action to take responsive to the abandonment event;
   directing the browser window based on the action; and
   determining an abandonment ratio for content of one or more web pages;
   wherein the action is based on the abandonment ratio.

8. The system of claim 7, wherein the abandonment profile is modified based on past user behaviors.

9. The system of claim 8, wherein the past user behaviors comprise categories of products.

10. The system of claim 7, wherein directing the browser window comprises navigating to an interstitial page.

11. The system of claim 10, wherein the instructions further cause the processor to carry out the steps of:
    receiving a selection of one or more products to be purchased by the user; and
    wherein the interstitial page gives the user an option to place the one or more products in a cart.

12. The system of claim 11, wherein determining an abandonment event further comprises detecting that a history for the browser window is null.

13. A method of preventing a user abandonment from a browser window on a user mobile device, the method comprising:
    redirecting a browser window, based on an abandonment profile that is set by the user, responsive to detecting that a popstate is triggered by the user.

14. The method of claim 13, wherein the abandonment profile comprises categories of products that are selectable by the user.

15. The method of claim 14, wherein each of the categories of products comprise an option, the option comprising whether or not to have back-out protection for the category.

16. The method of claim 15, wherein the categories are selected through user behavior.

17. The method of claim 16, wherein the abandonment profile comprises an option for a pop-up message for the user.

* * * * *